United States Patent [19]

Nattel

[11] Patent Number: 4,692,562

[45] Date of Patent: Sep. 8, 1987

[54] SEAL FOR A CABLE CONNECTOR

[75] Inventor: William Nattel, Montreal, Canada

[73] Assignee: Commander Electrical Materials, Inc., Quebec, Canada

[21] Appl. No.: 780,452

[22] Filed: Sep. 26, 1985

[51] Int. Cl.[4] .............................................. H02G 3/18
[52] U.S. Cl. .................................... 174/65 SS; 174/78
[58] Field of Search ............. 174/65 SS, 78; 285/158, 285/161, 322, 343; 277/215, 901

[56] References Cited

U.S. PATENT DOCUMENTS

| | | | |
|---|---|---|---|
| 2,788,992 | 4/1957 | De Vienne et al. | 285/158 |
| 3,314,030 | 4/1967 | Mallett et al. | 174/65 SS X |
| 3,567,843 | 3/1971 | Collins et al. | 174/65 SS X |
| 3,700,268 | 10/1972 | Nielsen, Jr. | 285/343 X |
| 3,739,076 | 6/1973 | Schwartz | 174/65 SS X |

FOREIGN PATENT DOCUMENTS 1197423  7/1970  United Kingdom ................ 285/343

Primary Examiner—Arthur T. Grimley
Assistant Examiner—David A. Tone
Attorney, Agent, or Firm—Fetherstonhaugh & Co.

[57] ABSTRACT

A seal for a cable connector used to connect cables and the like to a partition or a housing provides that one size of seal can be used with a wider range of cable sizes than existing seals. The seal for the connector has a substantially tubular body made from elastomeric material. The body has a cylindrical inner surface, a frusto-conical outer surface extending from a small end with a curved lip at the small end. A large end at the other end of the tubular body and recesses formed in the tubular body between the inner surface and the outer surface, making the tubular body compressible.

6 Claims, 5 Drawing Figures

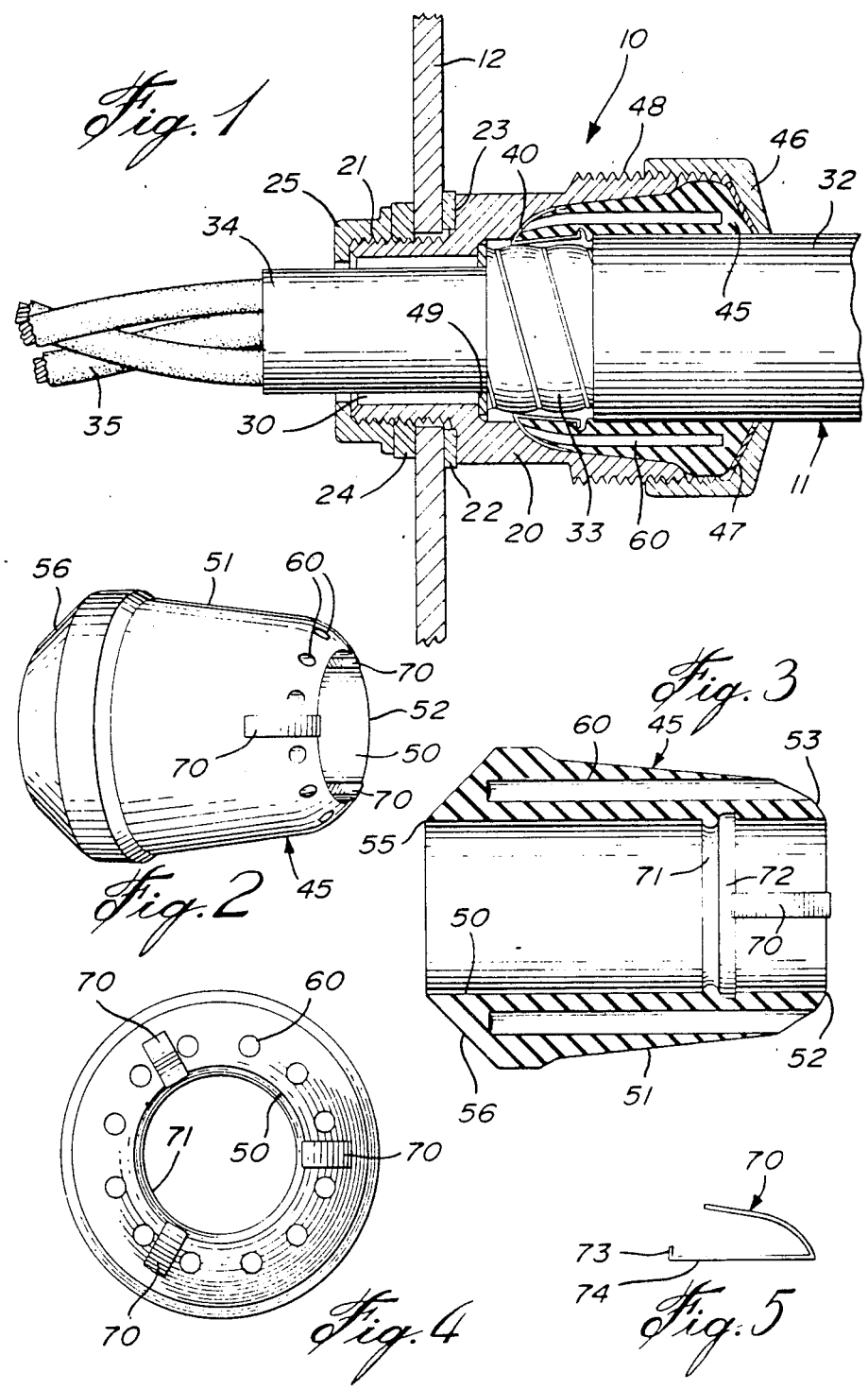

SEAL FOR A CABLE CONNECTOR present invention relates to a seal for a connector of the type used to connect elongated members, such as electrical cables to a fixed partition of an enclosure. More specifically, the invention relates to a seal for gripping and grounding a cable in a connector housing.

Seals for connectors of electrical cables are well known. The seals are used to prevent liquids leaking through a partition or housing at the point where the cable passes through, provide grounding and also to make it difficult to pull the cable out of the connector once the installation is made. One type of seal commonly used that prevents the cable from being pulled out of the connector is one made of substantially firm elastomeric material. Elastomeric seals, however, have to grip the cable, thus can only be used with a limited range of cable size since elastomeric material has little compressibility. This results in a different size of seal for each range of cable size for a specific connector. This, of course, increases inventory costs.

It is a purpose of the present invention to provide a seal for a cable connector that can be used with a wider range of cable sizes. Thus the number of seals that have to be carried in inventory can be reduced. It is another purpose of the present invention to provide a seal for an electrical connector that has superior grounding and holding properties for cables.

In accordance with the present invention an improved seal is provided for sealing a cable in a connector housing, the seal has a tubular body made from firm elastomeric material, the body having means formed therein that allows greater compressibility of the seal than known hereto before.

The present invention also provides an electrical cable connector for sealing a cable passing through a partition which includes a rigid tubular housing having a seal therein made from a firm elastomeric material. The seal having a curved lip and means formed therein that allows greater compressibility of the seal than previously known such that the curved lip swivels inwards in the housing to contact and ground a cable therein, and the body of the seal grips and seals to the outer jacket of the cable.

The seal body is of a generally tubular shape having a cylindrical inner surface, a frusto-conical outer surface extending from a small end having a curved lip at the small end where the outer surface and inner surface join. A large end surface is provided on the tubular body at the other end of the body joining the inner surface and the outer surface. Recesses are formed in the tubular body between the inner surface and the outer surface. These recesses permit the curved lip of the tubular body to have more inward or swivelling movement and also allow the tubular body to be compressed or squeezed thinner than normal to accomodate a wider range of cable sizes than before.

The present invention provides a seal for sealing a cable in a connector, the seal having a substantially tubular body made from resilient elastomeric material, the body comprising a cylindrical inner surface, a frusto-conical outer surface extending from a small end having a curved lip at the small end where the outer surface and the inner surface join, a large end surface on the tubular body at the other end of the body joining the inner surface and the outer surface, and recesses formed in the tubular body between the inner surface and the outer surface.

The present invention also provides an electrical cable connector for sealing a cable passing through a partition, comprising a rigid tubular housing with external attachment means for attachment to an aperture in the partition, the tubular housing having a passage therethrough for a cable, and a curved shoulder within the passage, a substantially tubular seal made from firm resilient elastomeric material, the seal having a cylindrical inner surface, a frusto-conical outer surface extending from a small end, having a curved lip at the small end where the outer surface and the inner surface join, a large end surface on the tubular seal at the other end of the seal joining the inner surface and the outer surface, and recesses formed in the seal between the inner surface and the outer surface, the seal fitting within the housing with the curved lip against the curved shoulder, and a threaded cover fitted on an external thread on the housing to push against the large end surface of the seal so that the curved lip of the seal is compressed and adapted to contact the cable in the housing.

In other embodiments, grounding fingers may be fitted over the curved lip of the seal. The fingers are adapted to contact and ground the cable when the threaded cover is tightened to the housing. In another embodiment, the seal is formed of conductive elastomeric material for grounding purposes.

In drawings which illustrate embodiments of the invention,

FIG. 1 is a cross-sectional view through one embodiment of an electrical cable connector according to the present invention.

FIG. 2 is a perspective view of a seal for the connector shown in FIG. 1.

FIG. 3 is a sectional view through the seal shown in FIG. 2.

FIG. 4 is an end view of the seal shown in FIG. 2.

FIG. 5 is a side view of a grounding finger.

An electrical connector 10 is shown in FIG. 1 having an electrical cable 11 connected therein. The connector 10 is shown fitting in an aperture in a partition wall 12 and is arranged to grip and seal the partition 12. The connector 10 has a rigid generally tubular connector body 20 which at one end has an exterior threaded portion 21 passing through the aperture in the partition 12. A flange gasket 22 is positioned adjacent an exterior shoulder 23 of the connector body 20 so that it is between the shoulder 23 and the partition wall 12. A lock nut 24 on the exterior threaded portion 21 grips and seals the connector 10 to the partition 12. Optionally, a threaded bushing 25 may also be used acting as a second lock nut. Whereas a lock nut 24 and bushing 25 are shown herein, the threaded portion 21 may fit directly into a threaded opening of an enclosure.

The connector 10 has an aperture 30 therethrough for the cable 11. The cable 11 has an outer jacket 32 surrounding a metallic armour 33 for protection purposes, which in turn surrounds an inner jacket 34 protecting a plurality of conductor wires 35. The tubular connector housing 20 has a curved inner surface or curved inner shoulder 40 within the passage 30 which is used as a stop for the seal 45. Details of the seal will be described hereafter. An outside gland nut 46 mates with an external thread 48 on the outside of the connector body 20 and pushes the seal 45 against the curved inner shoulder 40 so that the lip of the seal 45 swivels to contact the armour 33 of the cable 11, and the body of the seal 45 grips and seals against the outer jacket 32 of the cable 11. A tapered pressure ring 47 may be positioned between the seal 45 and the gland nut 46.

Details of the seal 45 are illustrated in FIGS. 2, 3 and 4. The seal in the form of a bushing is made from a firm resilient elastomeric material such as a synthetic or natural rubber. It has a substantially tubular body with a cylindrical inner surface 50 and a frusto-conical outer surface 51 extending from a small end 52 which has a curved lip 53. The curved lip 53 joins the inner surface 50 and the outer surface 51 together at the small end 52. At the other end, which is a large end 55, a tapered surface 56 extends from the large end 55 and is designed to mate with the pressure ring 47 or if it is not used, the gland nut 46.

Apertures 60 are provided in the seal 45 between the inner surface 50 and the outer surface 51. As shown in the drawings the apertures 60 are equi-spaced and extend circumferentially about the tubular body from the curved lip 53. The apertures, which are shown as having a circular cross section, provide for considerably more compression of the seal and yet do not break the seal as they do not extend through the tubular body. The curved lip 53 is designed to substantially fit the curved inner shoulder 40 in the connector body 20. When the seal 45 is in place in the connector body 20 and the gland nut 46 is tightened, the curved lip 53 is compressed and swivels inwards to contact the armour 33. The apertures 60 are shown as extending axially to the tubular body of the seal 45, however, as will be understood, the shape and position of the apertures 60 need not be restricted to that shown in the drawings but may be formed in different shapes and even in different directions provided the curved lip 53 of the seal 45 can swivel to contact the armour and the body of the seal can be compressed and deformed to grip and seal different sizes and diameters of cables within the connector.

When the cable 11 has a metallic armour 33, it is necessary to ground the armour 33 and this is done in two ways. In one embodiment the seal 45 is made of a conductive elastomeric material, thus there is an electrical contact between the armour 33 and the connector body 20 through the curved lip 53 of the seal 45, creating also a grounding connection to the partition wall 12. In another embodiment, metallic grounding fingers 70 as shown in FIG. 5, are fitted over the curved lip 53 of the seal 45 and these fingers 70 provide a ground connection between the armour 33 and the connector body 20 of the connector 10. The grounding fingers 70 also aid in swivelling the curved lip 53 inwards to contact the armour 33 or cable 11. As can be seen in FIG. 3, a ridge 71 and internal circular groove 72 are included in the inner surface 50 of the seal and each finger 70 has an abutment 73 at the end of its straight arm 74 which fits into the groove 72. Thus the fingers 70 are not pushed out of the seal when the seal bushing is fitted over the cable 11. The grounding fingers 70 act to swivel the rest of the lip inwards at the same time. Three fingers 70 are shown, however, it will be apparent that more or less could be used depending upon the diameter and size of the sleeve 45. The ridge 71 guides the armour 33 and keeps it in the centre of the bushing as well as preventing the armour 33 from dislodging the fingers 70.

The outer jacket 32 is first stripped off the cable leaving the armour 33 exposed as illustrated in FIG. 1. The cable 11 is then inserted through passageway 30 of the connector, through the seal 45 with the gland nut 46 slackened off. The armour 33 should not pass right through the connector 10, and an armour stop 49 prevents the armour 33 from passing completely through the connector. In other instances, there may not be an armour stop 49 depending upon the size of cable and size of connector body for the cable. The gland nut 46 is then tightened which pushes the seal 45 against the curved shoulder 40, causing the curved lip 52 to compress and swivel inwards to contact the armour 33 and the body of the seal 45 to grip and seal against the outer jacket 33 of the cable 11. When a small cable is used, the swivel action of the lip is greater than when a large cable is fitted in the connector, however, the apertures 60 provide the flexibility and compressibility to take into account a wide range of cable sizes.

While the seal and connector have been described for use with an electrical cable, it will be apparent that the connector and seal may also be used with other types of elongated members such as conduit pipes or tubes.

Various changes may be made to the embodiments shown herein without departing from the scope of the present invention which is limited only by the following claims.

The embodiments of the invention in which an exclusive property or privilege is claimed are defined as follows:

1. An electrical cable connector for sealing a cable passing through a partition, comprising:
   a rigid tubular housing with external attachment means for attachment to an aperture in the partition, the tubular housing having a passage therethrough for a cable, and a concave curved shoulder at a small termination of a frusto-conical inner surface within the passage,
   a substantially tubular seal made from firm resilient elastomeric material, the seal having a cylindrical inner surface, a fursto-conical outer surface extending from a small end, having a convex curved lip at the small end where the outer surface and the inner surface join, the convex curved lip having substantially the same curvature as the concave curved shoulder of the housing, a large end surface on the tubular seal at the other end of the seal joining the inner surface and the outer surface, and longitudinal recesses formed in the seal between the inner surface and the outer surface, the recesses extending from the convex curved lip at the small end towards the large end surface, the seal fitting within the housing with the curved lip against the curved shoulder, and
   a threaded cover to fit on an external thread on the housing to push against the large end surface of the seal so that the curved lip of the seal is compressed and adapted to contact the cable in the housing.

2. The cable connector according to claim 1, including a plurality of grounding fingers fitting over the curved lip of the seal extending form the inner surface to the outer surface, the grounding fingers adapted to contact and ground the cable when the threaded cover is tightened to the housing.

3. The cable connector according to claim 2 wherein the inner surface of the seal has an internal circular groove therein and each of the grounding fingers has an end that fits into the circular groove.

4. The cable connector according to claim 1 wherein the seal is formed of conductive elastomeric material.

5. The cable connector according to claim 1 wherein the longitudinal recesses in the seal are equispaced circumferentially about the seal.

6. The cable connector according to claim 1 wherein the longitudinal recesses extend axially to the tubular body and have a circular cross section.

* * * * *